(12) United States Patent
Svensson et al.

(10) Patent No.: US 6,711,694 B1
(45) Date of Patent: Mar. 23, 2004

(54) APPARATUS AND METHOD FOR GENERATING A MODULATED CLOCK SIGNAL INCLUDING HARMONICS THAT EXHIBIT A KNOWN SIDEBAND CONFIGURATION

(75) Inventors: Lars Svensson, Göteborg (SE); Hans Lindkvist, Lund (SE)

(73) Assignee: Telefonaktiebolaget LM Ericsson(publ), Stockholm (SE)

(*) Notice: Subject to any disclaimer, the term of this patent is extended or adjusted under 35 U.S.C. 154(b) by 0 days.

(21) Appl. No.: 09/496,739

(22) Filed: Feb. 3, 2000

(51) Int. Cl.⁷ .............................. G06F 1/04; G06F 1/06; G06F 1/08
(52) U.S. Cl. .................. 713/500; 713/501; 713/502; 713/600
(58) Field of Search ................. 713/500, 501, 713/502, 600, 601; 315/85; 333/12

(56) References Cited

U.S. PATENT DOCUMENTS

| | | | | |
|---|---|---|---|---|
| 5,097,158 A | * | 3/1992 | Michel | 327/178 |
| 5,426,392 A | | 6/1995 | Kornfeld | 327/551 |
| 5,442,664 A | * | 8/1995 | Rust et al. | 375/371 |
| 5,659,339 A | | 8/1997 | Rindal et al. | 345/212 |
| 5,731,728 A | | 3/1998 | Greiss | 327/299 |
| 5,732,106 A | * | 3/1998 | Rasmussen et al. | 375/296 |
| 6,160,861 A | * | 12/2000 | McCollough | 375/376 |

FOREIGN PATENT DOCUMENTS

| | | | | |
|---|---|---|---|---|
| EP | 0 163 313 A2 | 12/1985 | | |
| EP | 163313 A2 | * 12/1985 | ............ | H03B/29/00 |
| EP | 0 704 833 A2 | 4/1996 | | |
| EP | 0 823 801 A2 | 2/1998 | | |
| EP | 104963 | 10/2000 | | |
| JP | 81143461 | 3/1983 | | |
| JP | 8961832 | 9/1990 | | |
| JP | 10232760 A | * 9/1998 | ............ | G06F/7/00 |
| JP | 10120620 | 1/1999 | | |

OTHER PUBLICATIONS

Y. Moon, D. Jeong, G. Kim; "Clock dithering for electro-magnetic compliance using spread spectrum phase modulation", Solid–State Ckts. Conf., 1999. Digest of Tech. Papers. ISSCC. 1999 IEEE Intnl, Feb. 15–17, 1999, Pg(s): 186–187.*

Proakis, et al.; *Digital Signal Processing Principles, Algorithms, and Applications*; 1992; Section 2., pp. 12–13 and Section.2.62, pp. 140–141.

Golomb.; *Shift Register Sequences*; 1967; pp. 24–48.

* cited by examiner

*Primary Examiner*—Thomas Lee
*Assistant Examiner*—James K. Trujillo
(74) *Attorney, Agent, or Firm*—Jenkens & Gilchrist, P.C.

(57) ABSTRACT

An apparatus and method are provided that helps address the electromagnetic compatibility issues arising from the integration of digital circuitry and analog circuitry within a wireless mobile terminal (for example). Basically, the apparatus includes a clock generator capable of generating an unmodulated clock signal and a modulator capable of generating a modulated clock signal having selected clock pulses omitted from the unmodulated clock signal. The modulated clock signal includes a fundamental frequency and a plurality of harmonic frequencies that exhibit a known sideband configuration. The known sideband configuration can be selected such that there would be less harmonic content in a band where co-located analog circuitry could be adversely affected by electro-magnetic interference from the modulated clock signal.

20 Claims, 5 Drawing Sheets

APPARATUS AND METHOD FOR GENERATING A MODULATED CLOCK SIGNAL INCLUDING HARMONICS THAT EXHIBIT A KNOWN SIDEBAND CONFIGURATION

BACKGROUND OF THE INVENTION

1. Technical Field of the Invention

The present invention generally relates to digital circuits and, in particular, to an apparatus and method for generating a modulated clock signal including harmonics that exhibit a known sideband configuration.

2. Description of Related Art

From the early days of electronic components, size has been an important factor in component design. With the ever increasing integration of electronics into everyday life, component size has become a critical aspect of the design of electronic devices. Although the public is demanding more compact electronics, it is not willing to give up features that add size to those electronics. In fact, the demand for more compact electronic devices is only rivaled by the demand for more features in those devices. Electronic component designers are thus forced to miniaturize electronics while they integrate more features and more components into those electronics.

In no field is miniaturization and integration more important than in the field of circuit design. It is beneficial for a variety of reasons to be able to miniaturize circuits and to place more components in those circuits. Such miniaturization and integration results in, for example, a reduction in manufacturing costs, a reduction in overall device size, and the provision of more features in the same size device. For many electrical devices, especially wireless mobile terminals, it is equally beneficial to integrate digital and analog components. However, the integration of analog and digital components, when combined with ever increasing miniaturization, leads to electromagnetic compatibility (EMC) problems. These EMC problems need to be solved so that highly-integrated systems of digital and analog circuitry can work reliably. For example, in wireless mobile terminals, high-frequency analog signals are handled near digital circuitry which can easily disrupt the high-frequency analog signals and cause degraded receiver performance or spectrum mask violations of transmitted signals.

Presently, EMC issues arising from the integration of digital circuitry and analog circuitry are addressed in many different ways—none of which are wholly satisfactory. Particularly unsatisfactory is the existing digital technology associated with the clock signal which can cause the aforementioned problems if coupled into sensitive analog circuitry. For instance, the harmonic components of the clock signal can fall on a pass band of a radio-frequency (RF) signal and cause interference if that RF signal is coupled to sensitive analog circuitry. Therefore, it is important to control the shape or configuration of the harmonic components of the clock signal.

One traditional way of modifying the configuration of the harmonic components of the digital clock signal is by phase-modulating the digital clock signal. Reference is made to U.S. Pat. Nos. 5,426,392 and 5,731,728 for descriptions of prior art methods associated with phase modulation of clock signals. These traditional phase-modulation methods have drawbacks. In some methods, analog elements and noise sources are used for phase modulation; this practice makes the sideband levels difficult to accurately predict and also complicates testing. In other methods, the digital hardware used to generate the phase-modulated signal is clocked at a very high frequency, which causes high power dissipation in CMOS (Complementary Metal-Oxide Semiconductor) implementations. All the methods referred to are difficult to apply to partial designs, since the phase relationship between signals in different parts would not be constant. Therefore, there is a need for an apparatus and a method capable of generating a phase-modulated clock signal cheaply and predictably, which would also be possible to use on partial designs.

BRIEF DESCRIPTION OF THE INVENTION

The present invention is an apparatus and method that helps address the electromagnetic compatibility issues arising from the integration of digital circuitry and analog circuitry within a wireless mobile terminal (for example). Basically, the apparatus includes a clock generator capable of generating an unmodulated clock signal and a modulator capable of generating a modulated clock signal having selected clock pulses omitted from the unmodulated clock signal. The modulated clock signal includes a fundamental frequency and a plurality of harmonic frequencies that exhibit a known sideband configuration. The known sideband configuration can be selected such that there would be less harmonic content in a band where co-located analog circuitry could be adversely affected by electro-magnetic interference from the modulated clock signal.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

To better present and describe the present invention a detailed description of the preferred method 300 and exemplary apparatus 510 of the present invention is deferred pending a brief discussion about unmodulated clock signals, modulated clock signals and the differences between the harmonic contents of the unmodulated clock signal and the modulated clock signal.

Figure 1:
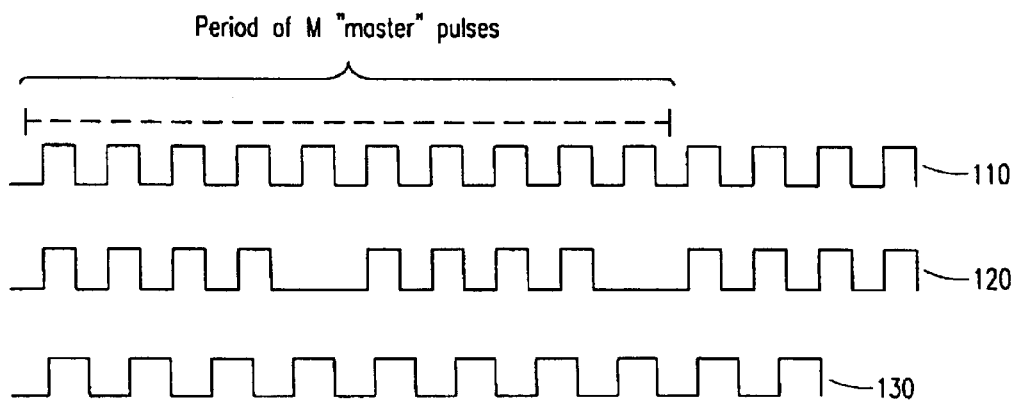
FIG. 1 illustrates exemplary signal diagrams of unmodulated clock signals and a modulated clock signal.

Referring to FIG. 1, there are illustrated exemplary signal diagrams of an unmodulated clock signal 110 and a modulated clock signal 120. The modulated (dithered) clock signal 120 can be described as a clock signal which has one or more of every M clock pulses removed (where M is a constant number, after which the process repeats). In contrast, the unmodulated (undithered) clock signal 110 can be described as a clock signal which has no clock pulses removed. An example, of an unmodulated clock signal 110 and a modulated clock signal 120 where the fifth and tenth clock pulses have been removed are shown in FIG. 1.

The modulated clock signal 120 may be mathematically derived by adding a time-varying phase $\phi(t)$ to a time base of a unmodulated clock signal 130 having the same effective frequency (i.e., the same number of pulses per unit of time) as the modulated clock signal 120. The modulated clock signal 120 with an average angular frequency $\omega$ may then be described by the expression $v(\omega t+\phi(t))$, where the function $v(\omega t+\phi(t))$ is periodic and the long-term average value of the phase function $\phi(t)$ is zero. The phase function $\phi(t)$ can be chosen such that the modulated clock signal 120 can have one or more clock pulses periodically absent when compared to the unmodulated clock signal 110. In addition, the term "jittering clock" is usually understood to mean a modulated clock signal having a phase function $\phi(t)$ that has a smaller magnitude and varies more slowly than the phase function $\phi(t)$ of the modulated clock signal 120.

It should be understood that digital circuitry driven by a modulated clock signal has a lower computational throughput than if it were driven by an unmodulated clock signal. This is true since each omitted clock pulse in the modulated clock signal represents a lost opportunity for computation. Thus, the amount of throughput reduction depends directly on the percentage of clock pulses removed from the unmodulated clock signal. Also, digital circuitry using the modulated clock signal can be equivalent throughput-wise to a digital processing system using an unmodulated clock signal of the same effective frequency as the modulated clock signal.

Figure 2:
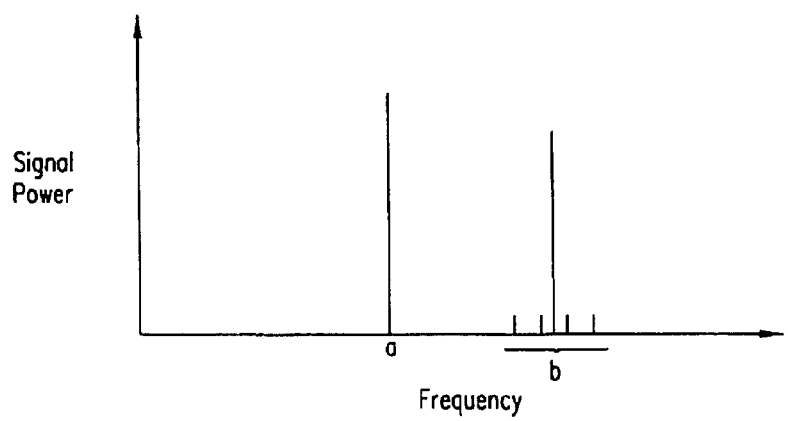
FIG. 2 is a graph illustrating the differences between the harmonic content of an unmodulated clock signal and the harmonic content of a modulated clock signal of the same effective frequency as the unmodulated clock signal.

Referring to FIG. 2, there is an exemplary graph illustrating the differences between the harmonic content "a" of an unmodulated clock signal and the harmonic content "b" of a modulated clock signal. An unmodulated clock signal can be approximated as a symmetric square wave having finite rise and fall times (see FIG. 1). As such, the unmodulated clock signal has main harmonics that fall at odd factors of a fundamental frequency $f_c$, i.e., at $(2n+1) f_c$, $n=1, 2, \ldots$ (only one harmonic "a" is shown). In contrast, the modulated clock signal has main harmonics that include sideband harmonics that surround each main harmonic (only one main harmonic and four sideband harmonics "b" are shown) As shown, the signal power in the unmodulated case is concentrated at a main harmonic frequency, and the signal power in the modulated case is "smeared out" across a main harmonic and sideband harmonics.

Thus, replacing an unmodulated clock signal with a modulated clock signal of the same effective frequency can have three effects on the harmonics of the modulated clock signal: (1) the main harmonic is moved to a higher frequency; (2) the level of the main harmonic is reduced corresponding to the percentage of clock pulses omitted; and (3) the power removed from the main harmonic is distributed over several sideband harmonics that appear around the main harmonic.

Referring to FIGS. 3–7, there are disclosed the preferred method 300 and two embodiments of the exemplary apparatus 510 both of which generate a modulated clock signal including harmonics that exhibit a known sideband configuration in accordance with the present invention Basically, the present invention enables a designer to select a desirable sideband configuration by knowing what the different magnitudes (e.g., signal power) of the main harmonics and corresponding sideband harmonics would be prior to generating a modulated clock signal that exhibits a similar sideband configuration.

Figure 3:
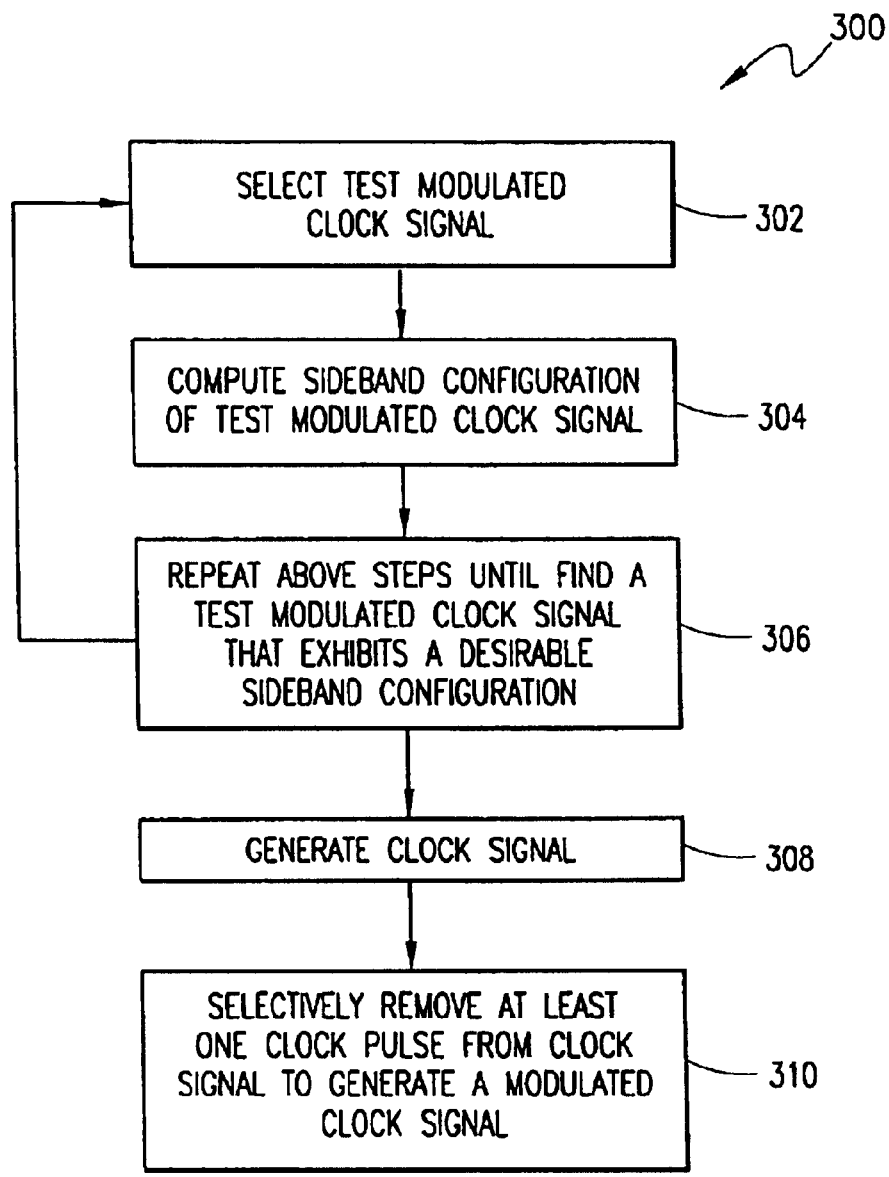
FIG. 3 is a flowchart illustrating the steps of a preferred method of the present invention.

Referring to FIG. 3, there is a flowchart illustrating the basic steps of the preferred method 300 of the present invention. Beginning at step 302, at least one of M clock pulses is selected to be removed from a test clock signal to generate a test modulated clock signal. The test clock signal and the test modulated clock signal are not to be confused with the clock signal and the modulated clock signal that are generated by the present invention at steps 308 and 310 (described below).

At step 304, a sideband configuration or power distribution of the test modulated clock signal may be computed by Fourier transforming (for example) the test modulated clock signal. Then at step 306, the selecting step 302 and the computing step 304 are repeated until a test modulated clock signal is found that exhibits a desirable sideband configuration. To find a test modulated clock signal that exhibits a desirable sideband configuration, one has to determine how many of the clock pulses need be removed and also determine the particular location in a period of the test modulated clock signal at which each clock pulse needs to be removed. Steps 302, 304 and 306 may be carried out once and for all during design of the apparatus 510; they may be carried out entirely by computing circuitry in the apparatus 510; or the work may be distributed across the design phase and the operational phase. Two examples of such computed sideband configurations are shown in FIG. 4.

Figure 4:
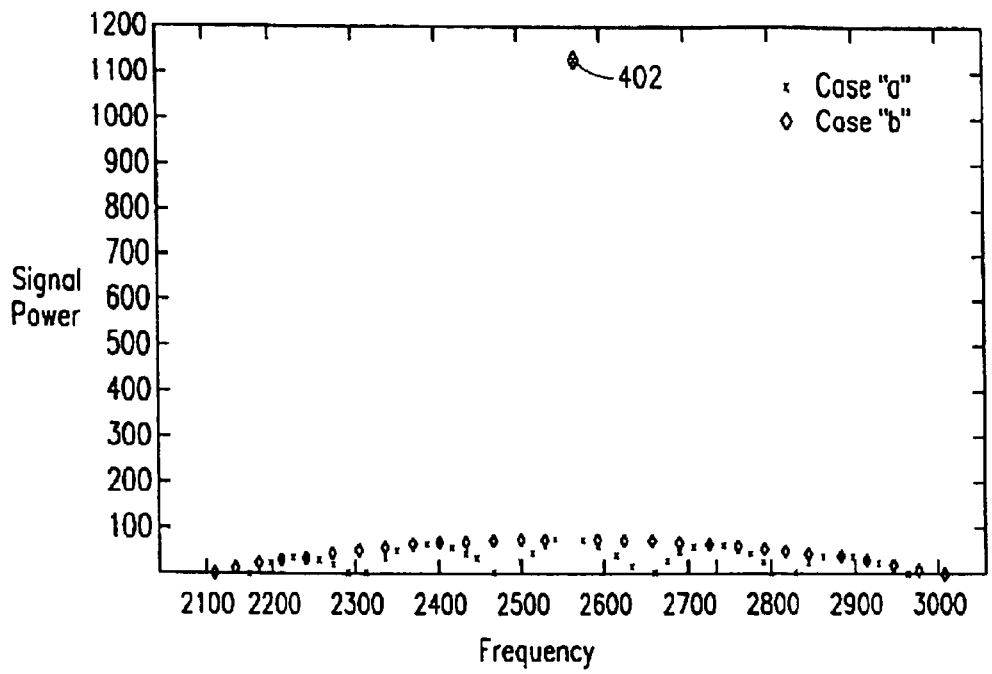
FIG. 4 is a graph illustrating exemplary sideband configurations of two test modulated clock signals as determined by step 304 of the method shown in FIG. 3.

Referring to FIG. 4, there is a graph illustrating two sideband configurations of two test modulated clock signals each of which has had two clock pulses removed out of a period of 32 clock pulses. The graph illustrates the sideband configuration around the fifth harmonic 402 of each test modulated signal which is computed by performing a Fourier transform on the respective test modulated signal (other sidebands around other odd harmonics are similar). The precise distribution of power in the sidebands also depends on which of the 32 clock pulses are omitted. For instance, the sideband configuration of the first test modulated clock signal (shown as case "a") where the $1^{st}$ and $4^{th}$ clock pulses of every 32 clock pulses were omitted is different than the sideband configuration of the second test modulated clock signal (shown as case "b") where the $1^{st}$ and the $17^{th}$ clock pulses of every 32 clock pulses were omitted. Such Fourier transform computations can be used to select a test modulated clock signal that exhibits a desirable sideband configuration.

It should be understood that the amount of sideband signal power corresponds to the percentage of clock pulses removed which also corresponds to the percentage of throughput reduction. For instance, a throughput reduction of 10% corresponds directly to a reduction in the power level of the main harmonic by 10%, and to an overall increase in the power of the harmonic's side bands by 10%. Again, the precise distribution of the power in the harmonic's sidebands depends on which 10% of the clock pulses are removed.

Figure 5:
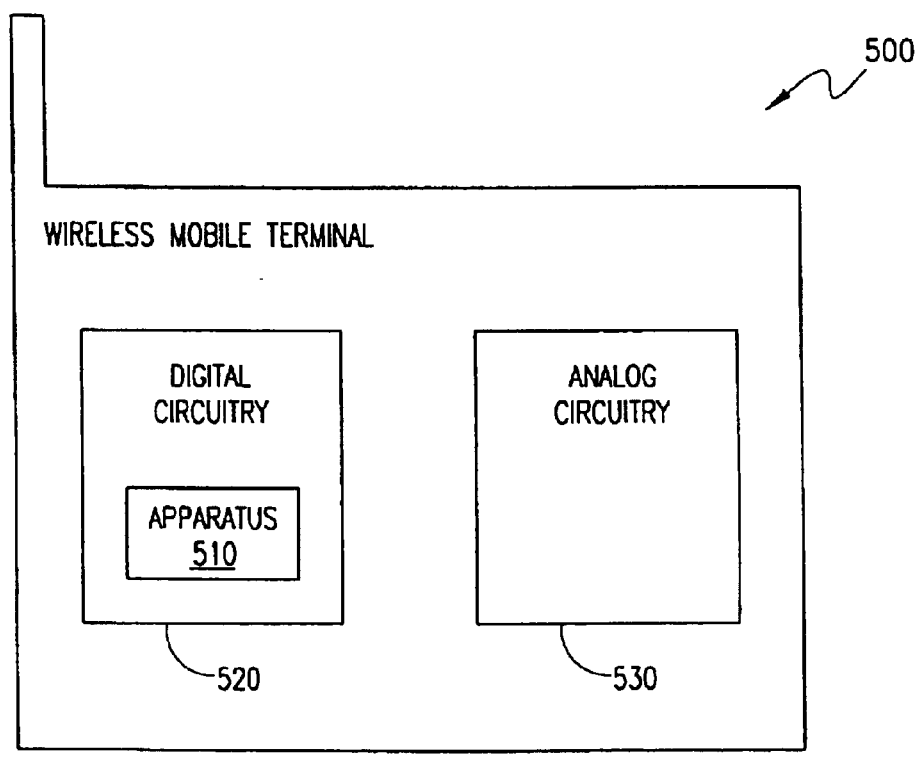
FIG. 5 is a simplified diagram illustrating a wireless mobile terminal incorporating an apparatus of the present invention.

Referring to step 308 of FIG. 3, a clock signal is generated within a digital processing system of a device (e.g., wireless mobile terminal 500 of FIG. 5). How this clock signal is generated is well known to those skilled in the art.

At step 310, at least one of M clock pulses is selectively removed from the clock signal to generate the modulated clock signal that can be used within the device. The modulated clock signal is generated to mirror the test modulated clock signal in that the same number of clock pulses at the same locations are omitted. Thus, the modulated clock signal includes a fundamental frequency and a plurality of harmonic frequencies that exhibit a desirable sideband configuration wherein there is little (if any) harmonic content in a band where co-located analog circuitry (see analog circuitry 520 of FIG. 5) could be adversely affected by electromagnetic interference from the modulated clock signal.

Referring to FIG. 5, there is illustrated a simplified diagram of a wireless mobile terminal 500 incorporating an apparatus 510 of the present invention. Although two embodiments of the apparatus 510 will be described in detail with reference to the wireless mobile terminal 500, it will be readily understood by those skilled in the art that the present invention can be used in any type of circuitry that includes analog circuitry and digital circuitry. Accordingly, the apparatus 510 and its two embodiments described should not be construed in a limited manner.

The wireless mobile terminal 500 incorporates both digital circuitry 520 and analog circuitry 530. The apparatus 510 is incorporated within the digital circuitry 520 and operates to reduce the electromagnetic interference on the nearby analog circuitry 530. Basically, the apparatus 510 includes a clock generator capable of generating an unmodulated clock signal and a modulator capable of generating a modulated clock signal having selected M clock pulses omitted from the unmodulated clock signal. The modulated clock signal includes a fundamental frequency and a plurality of harmonic frequencies that exhibit a known sideband configuration. The known sideband configuration can be selected such that there would be less harmonic content in a band where co-located analog circuitry 530 could be adversely affected by electro-magnetic interference from the modulated clock signal.

Figure 6:
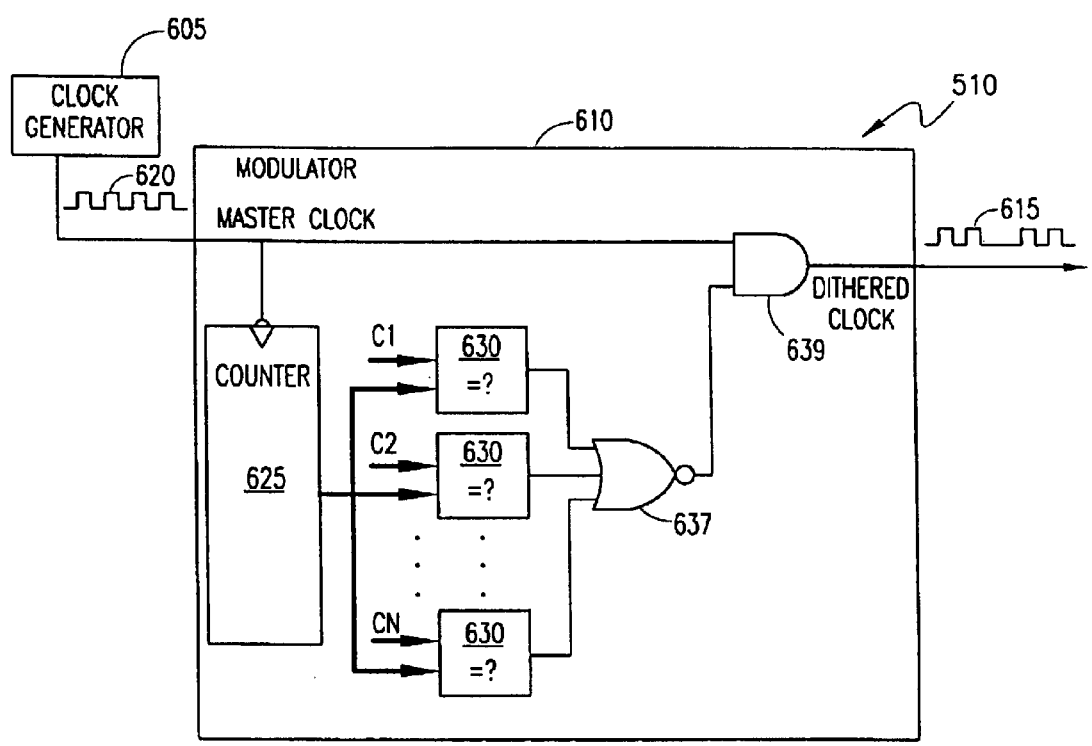
FIG. 6 is a block diagram illustrating in greater detail a first embodiment of the apparatus shown in FIG. 5.

Referring to FIG. 6, there is illustrated a first embodiment of the apparatus 510 which includes a clock generator 605 and a modulator 610. The modulator 610 configured as a counter-based state machine is capable of generating a modulated clock signal 615 by gating away at least one of every M clock pulses from an unmodulated clock signal 620 that was generated by the clock generator 605.

More specifically, the modulator 610 includes a counter 625 (e.g., wrap-around binary counter) capable of receiving the unmodulated clock signal 620 from the clock generator 605 and indexing the clock pulses of the unmodulated clock signal 620 to generate an output that increments by 1 after every clock cycle and rolls over at period M. For instance, if period M=4, then the generated output would be a sequence of values represented as 0 1 2 3 0 1 2 3 . . . , or in binary, 00 01 10 11 00 01 10 11 . . . .

The modulator 610 also includes at least one comparator 630 each of which is capable of receiving the output from the counter 625. Each comparator 630 operates to compare the output (e.g., sequence of values 00 01 10 11 00 01 10 11 . . . ) of the counter 625 to a constant value C1, C2 . . . CN. The constant values C1, C2 . . . CN are generally multi-bit constants, which in the simplest case can be implemented by hard-wiring the bits of one input to the comparator 630 to logic '1' and '0', as appropriate (see examples below described with respect to FIG. 4). In the alternative, it would also be possible to dynamically tailor the sideband configuration by modifying the constant values C1, C2 . . . CN as needed. Each comparator 630 operates to output a high value (binary '1') when there is a match or a low value (binary '0') when there is no match between the particular output of the counter 625 and the particular constant value C1, C2 . . . CN.

The modulator 610 further includes a logic device (shown as an NOR gate 637 and an AND gate 639) capable of receiving the output from each comparator 630 and removing a clock pulse from the clock signal whenever a match occurs within any comparator. As shown, the NOR gate 637 has an output that goes low for one cycle whenever any comparator 630 gives a match, so the corresponding clock pulse is gated away from the unmodulated clock signal 620 by the AND gate 639 which then outputs the modulated clock signal 615.

Assuming a designer wanted to configure a modulator 610 that generates a modulated clock signal that exhibits a sideband configuration similar to the sideband configuration shown in cases "a" and "b" of FIG. 4, then the modulator 610 would include a counter 625 with a period M=32, and there would be two comparators 630 because two pulses are to be removed for each M cycles in each case "a" and "b". In case "a", the modulated clock signal would have the $1^{st}$ and $4^{th}$ clock pulses of every 32 clock pulses omitted thus the two constant values would have binary values C1=1 and C2=4. And, in case "b", the modulated clock signal would have the $1^{st}$ and the $17^{th}$ clock pulses of every 32 clock pulses omitted then the two constant values would have binary values C1=1 and C2=17.

The thick wires in FIG. 6 denote buses of width >1; the bus width can be given by 2 log M. Therefore, the width of the inputs of each comparator is 2 log M. Furthermore in case "b", it should be understood that the modulator 610 could be simplified because the bit pattern representing C1=1 is 00001 and the bit pattern representing C2=17 is 10001. Thus, a single comparator 630 is sufficient when it is configured to have an output go high when four LSBs (least significant bits) of the counter's output have a bit 0001 pattern. Then the NOR gate 637 now has but one input and therefore reduces to an inverter.

Figure 7:
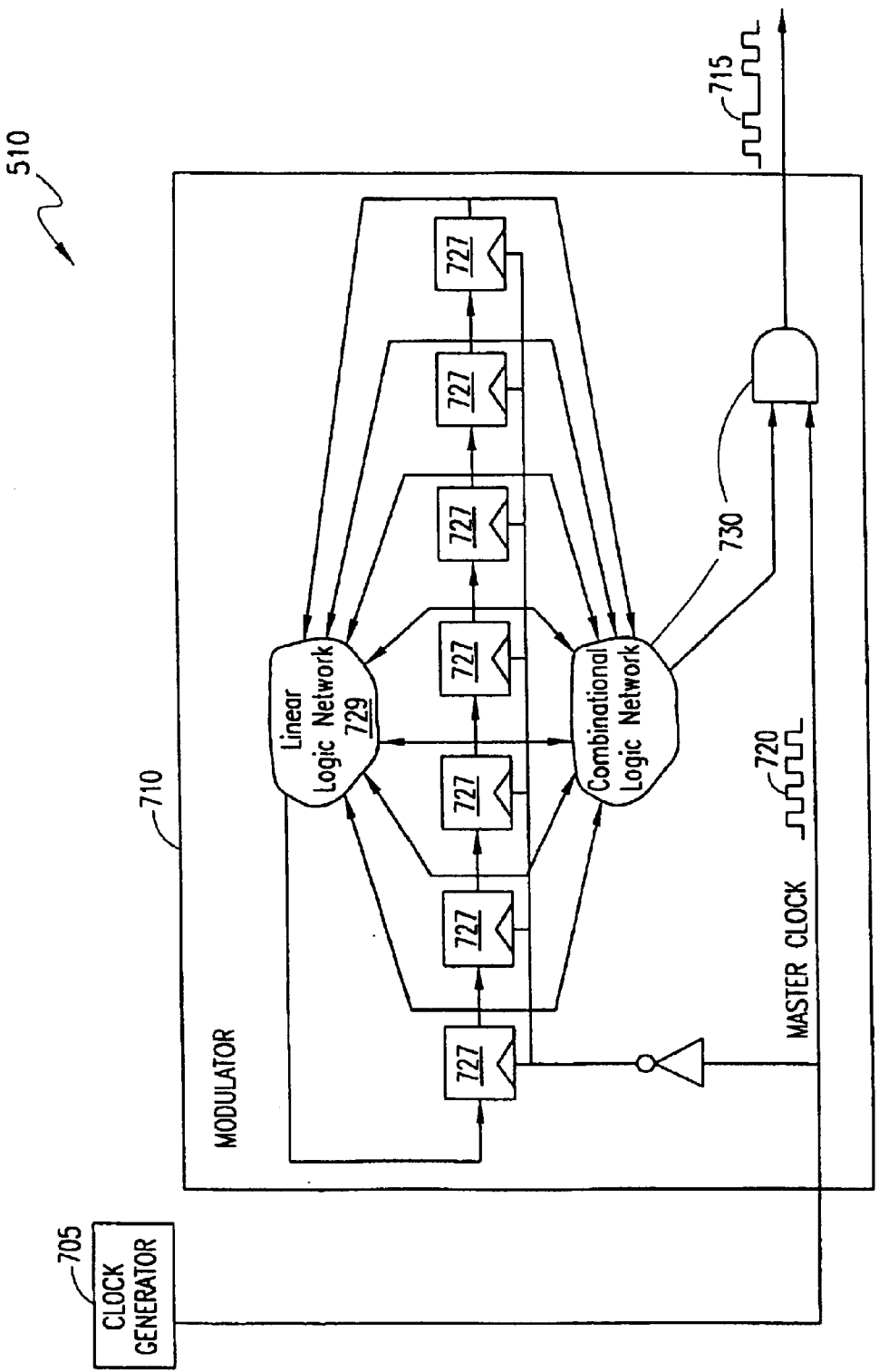
FIG. 7 is a block diagram illustrating in greater detail a second embodiment of the apparatus shown in FIG. 5.

Referring to FIG. 7, there is illustrated a second embodiment of the apparatus 510 which includes a clock generator 705 and a modulator 710. The modulator 710 configured as a pseudo-noise generator is capable of generating a modulated clock signal 715 by gating away at least one of every M clock pulses from an unmodulated clock signal 720 that was generated by the clock generator 705. The modulator 710 includes a shift register (e.g., multiple flip-flops 727) with linear feedback and a logic device 730 both of which are designed to generate the modulated clock signal 715. In particular, the shift register combines the outputs of a predetermined number of flip-flops 727 through a linear logic network 729 and feeds the result back to the shift register input. The flip-flop outputs are also combined in a second logic network 730 which outputs the modulated clock signal 715. It is possible in principle to generate any modulated clock signal of length $2_{K-1}$ (K is the number of flip-flops 727) even though some modulated clock signals require a more sophisticated logic device 730 than others. In the very simplest case, the logic device 730 reduces to a straight connection between one of its inputs and its output.

The shift register (e.g., multiple flip-flops 727) and the linear logic network 729 in the pseudo-noise generator serves the same purpose as the counter 625 in the finite state machine shown in FIG. 6: to enumerate uniquely the clock pulses within a period M. Likewise, the logic device 730 in the pseudo-noise generator serves the same purpose as the comparators 630, the NOR gate 637 and the AND gate 639 in the finite state machine shown in FIG. 6: to select some of the uniquely-identified clock pulses for deletion. As long as the clock pulses of the modulated clock signal are uniquely identified, it is always possible to construct a logic network which can select any subset of the clock pulses to omit in order to generate the modulated clock signal.

Both the pseudo-noise generator and the counter-based state machine can be used to repeatedly select certain clock pulses to be omitted from a sequence of clock pulses having a given length, M. However, the pseudo-noise generator would typically be used when M equals some power of two less one, and the counter-based state machine would be used when M equals some power of two. Another type of state machine would be needed if there was a value of M which is neither a power of two or a power of two less one. Thus, there are many ways one skilled in the art could design these and other state machines for any desired modulated clock signal, given the principles of the present invention. Again, the pseudo-noise generator and the counter-based state machine described above are exemplary for purposes of this discussion.

It should be understood that when the digital processing system is used with throughput requirements lower than the highest frequency it was designed to work at, then phase modulation of the undithered clock signal can give a system designer an additional degree of freedom for frequency planning. And, instead of plainly clocking the digital processing system at a reduced frequency, the system designer may elect to use a modulated clock signal which yields the same throughput but has its harmonics placed differently which can be beneficial for the overall system performance.

From the foregoing, it can be readily appreciated by those skilled in the art that the present invention provides an apparatus and method capable of generating a modulated clock signal having a desirable sideband configuration that helps address the EMC issues arising from the integration of digital circuitry and analog circuitry.

Although two embodiments of the apparatus and a method of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. An apparatus for generating a modulated clock signal including harmonics exhibiting a desired sideband configuration, the apparatus comprising:
   a clock generator for generating a clock signal;
   a modulator, coupled to said clock generator, for selectively removing at least one clock pulse of every M clock pulses from the clock signal in order to generate the modulated clock signal;
   wherein, prior to the selective removal, a test modulated clock signal is generated by removing the at least one clock pulse of every M clock pulses in order to achieve the desired sideband configuration; and
   wherein the modulated clock signal mirrors the test modulated clock signal.

2. The apparatus of claim 1, wherein said modulator further includes a counter-based state machine.

3. The apparatus of claim 2, wherein the counter-based state machine comprises a counter and a comparator and is adapted to gate away the at least one of every M clock pulses from the clock signal.

4. The apparatus of claim 1, wherein said modulator further includes a pseudo-noise generator.

5. The apparatus of claim 4, wherein the pseudo-noise generator comprises a shift register and a logic device and is adapted to gate away the at least one of every M clock pulses from the clock signal.

6. The apparatus of claim 1 further includes a wireless mobile terminal or a clock source.

7. The apparatus of claim 1 further comprising:
   means for selecting the at least one clock pulse of every M clock pulses in order to achieve the desired sideband configuration, the means for selecting comprising:
   means for generating the test modulated clock signal;
   means for computing a sideband configuration using a Fourier transform on the test modulated clock signal; and
   means for repeating the generation and the computation until the test modulated clock signal that exhibits the known desirable sideband configuration is determined.

8. A wireless mobile terminal comprising:
   a clock generator for generating a clock signal;
   a modulator, coupled to said clock generator, for selectively removing at least one of every M clock pulses from the clock signal in order to generate a dithered clock signal including a fundamental frequency and a plurality of harmonic frequencies that exhibit a known sideband configuration;
   wherein, prior to the selective removal, a test modulated clock signal is generated by removing the at least one of every M clock pulses to reduce harmonic content in a band co-located with analog circuitry; and
   wherein the dithered clock signal mirrors the test modulated clock signal.

9. The wireless mobile terminal of claim 8, wherein said modulator further comprises a counter-based state machine including:
   a counter for receiving the clock signal and generating an output that increments by one after every clock pulse and rolls over at a predetermined period;
   at least one comparator for comparing a predetermined value to the output of the counter; and
   at least one logic device for removing a clock pulse from the clock signal whenever a match occurs between the value and the output of the counter, wherein the distribution of power throughout the known sideband configuration of the dithered clock signal depends on which of the M clock pulses are removed from the clock signal.

10. The wireless mobile terminal of claim 9, wherein the counter is a wrap-around binary counter.

11. The wireless mobile terminal of claim 8, wherein said modulator further comprises a pseudo-noise, generator including:
   a shift register with linear feedback for receiving the clock signal and generating a sequence of output values which rolls over at a predetermined period;
   a logic network for receiving the output and state values of the shift register and generating an output pulse for at least one predetermined combination of these output and state values; and
   at least one logic device for removing the at least one of every M clock pulse from the clock signal using the output of the shift register, wherein the distribution of power throughout the known sideband configuration of the dithered clock signal depends on which of the M clock pulses are removed from the clock signal.

12. The terminal of claim 8, wherein said modulator further includes a counter-based state machine, the counter-based state machine comprising a counter and a comparator and being adapted to gate away the at least one of every M clock pulses from the clock signal.

13. The terminal of claim 8, wherein said modulator further includes a pseudo-noise generator, the pseudo-noise generator comprising a shift register and a logic device and is adapted to gate away the at least one of every M clock pulses from the clock signal.

14. The wireless mobile terminal of claim 8 further comprising:

means for selecting the at least one clock pulse of every M clock pulses in order to achieve the desired sideband configuration, the means for selecting comprising:

means for generating the test modulated clock signal;

means for computing a sideband configuration using a Fourier transform on the test modulated clock signal; and means for repeating the generation and the computation until the test modulated clock signal that exhibits the known desirable sideband configuration is determined.

15. A method for generating a modulated clock signal, said method comprising the steps of:

generating a clock signal;

selectively removing at least one of every M clock pulses from the clock signal in order to generate a modulated clock signal having a known sideband configuration;

wherein, prior to the selective removal, a test modulated clock signal is generated by removing the at least one of every M clock pulses to reduce harmonic content in a specified band co-located with an analog circuit; and wherein the modulated clock signal mirrors the test modulated clock signal.

16. The method of claim 15, wherein prior to completing said step of selectively removing at least one of every M clock pulse from the clock signal there is a step of determining which of the at least one clock pulse is to be removed from the clock signal comprising:

selecting the at least one of every M clock pulses to remove from a test clock signal to generate the test modulated clock signal;

computing a sideband configuration using a Fourier transform on the test modulated clock signal; and repeating the selecting step and the computing step until the test modulated clock signal is determined which exhibits the known desirable sideband configuration.

17. The method of claim 15, wherein said step of selectively removing the at least one of every M clock pulse from the clock signal is performed using a counter-based state machine.

18. The method of claim 17, wherein said counter-based state machine comprises a counter and a comparator and gates away the at least one of every M clock pulses from the clock signal.

19. The method of claim 15, wherein said step of selectively removing the at least one of every M clock pulse from the clock signal is performed using a pseudo-noise generator.

20. The method of claim 19, wherein said pseudo-noise generator comprises a shift register and a logic device and gates away the at least one of every M clock pulses from the clock signal.

* * * * *

UNITED STATES PATENT AND TRADEMARK OFFICE
CERTIFICATE OF CORRECTION

PATENT NO. : 6,711,694 B1
DATED : March 23, 2004
INVENTOR(S) : Lars Svensson et al.

It is certified that error appears in the above-identified patent and that said Letters Patent is hereby corrected as shown below:

Column 2,
Line 32, replace "may, be" with -- may be--

Column 3,
Line 48, replace "are shown)" with-- are shown).--
Line 67, replace "invention Basically" with -- invention.  Basically --

Column 4,
Line 58, replace "side bands" with -- sidebands --

Column 6,
Line 55, replace "$2_{K-1}$" with -- $2^{K-1}$ --

Signed and Sealed this

Twenty-seventh Day of July, 2004

JON W. DUDAS
*Acting Director of the United States Patent and Trademark Office*